United States Patent [19]

Stapp

[11] Patent Number: 4,485,872
[45] Date of Patent: Dec. 4, 1984

[54] SULFONE COSURFACTANTS IN ENHANCED OIL RECOVERY PROCESSES

[75] Inventor: Paul R. Stapp, Bartlesville, Okla.

[73] Assignee: Phillips Petroleum Company, Bartlesville, Okla.

[21] Appl. No.: 448,872

[22] Filed: Dec. 10, 1982

[51] Int. Cl.$^3$ .............................................. E21B 43/22
[52] U.S. Cl. ............................... 166/273; 252/8.55 D; 252/353
[58] Field of Search ...................... 252/8.55 D, 8.55 R, 252/363.5, DIG. 14; 166/273, 274, 275

[56] References Cited

U.S. PATENT DOCUMENTS

| | | | |
|---|---|---|---|
| 2,356,205 | 8/1944 | Blair et al. ........................... | 252/8.55 |
| 3,238,141 | 3/1966 | Gatza .................................... | 252/316 |
| 3,373,810 | 3/1968 | Williams . | |
| 3,508,611 | 4/1970 | Davis et al. ...................... | 252/8.55 X |
| 3,768,560 | 10/1973 | Hill et al. .............................. | 166/274 |
| 3,776,309 | 12/1973 | Murray et al. ....................... | 166/273 |
| 3,827,496 | 8/1974 | Schroeder ............................ | 166/273 |
| 4,013,125 | 3/1977 | Plummer et al. ............... | 252/8.55 X |
| 4,042,030 | 8/1977 | Savins et al. ........................ | 166/273 |
| 4,110,229 | 8/1978 | Carlin et al. ........................ | 252/8.55 |
| 4,125,158 | 11/1978 | Waite et al. ......................... | 166/273 |
| 4,231,427 | 11/1980 | Kalfoglou ............................ | 166/275 |
| 4,268,403 | 5/1981 | Buckman et al. ................... | 252/8.55 |

Primary Examiner—Herbert B. Guynn

[57] ABSTRACT

A surfactant system useful for oil recovery consisting essentially of a NaCl, a hydrocarbon sulfonate surfactant, such as a petroleum sulfonate, and a cosurfactant such as a sulfone or sulfolane derivative. In another embodiment, a $C_1$ to $C_8$ alcohol is additionally present as a cosurfactant.

18 Claims, 3 Drawing Figures

SULFONE COSURFACTANTS IN ENHANCED OIL RECOVERY PROCESSES

This invention relates to surfactant systems. More specifically, this invention relates to the use of new surfactant systems for oil recovery.

Waterflooding and surfactantflooding are processes well known in the art to recover vast quantities of oil which remain in the formation after primary oil recovery. In the case of surfactantflooding, it is not uncommon to employ a cosurfactant in conjunction with a surfactant wherein the latter aids in forming microemulsions with the oil to be recovered.

Alcohols are commonly used as cosurfactants in surfactant flooding processes. The use of alcohols has sometimes required a relatively large volume of surfactant slug to be employed and this can sometimes dictate against the economics of the process. Therefore, it is highly desirable to develop surfactant systems which are economical by reducing the pore volumes of surfactant slug employed and yet are still efficient.

In addition, the effectiveness and economic attractiveness of surfactant systems in oil recovery is enhanced by increased viscosity of the surfactant system. Increased viscosity helps to increase the sweep efficiency of the surfactantflood. Therefore, it is also highly desirable to develop thickened surfactant/cosurfactant systems exhibiting high viscosities.

It is therefore an object of this invention to provide a surfactant system comprising a surfactant and cosurfactant which is effective for tertiary oil recovery yet requires fewer pore volumes of the surfactant system. A further object of this invention is to provide a thickened surfactant system comprising a surfactant and cosurfactant which exhibits a high viscosity. Still, a further object of this invention is to provide surfactantflooding processes which enhance tertiary oil recovery.

These and other objects, advantages, details, features and embodiments of this invention will become apparent to those skilled in the art from the following detailed description of the invention and the appended claims.

In accordance with one embodiment of this invention, I have discovered that the use of sulfones and sulfolane derivatives as cosurfactants in surfactantflooding operations results in effective oil recovery while at the same time reducing the total pore volumes of surfactant needed to be effective for oil recovery.

In accordance with a second embodiment of this invention, I have discovered that a novel surfactant system consisting essentially of salt water, a hydrocarbon sulfonate surfactant and a sulfone or sulfolane derivative in conjunction with a $C_1$ to $C_8$ alcohol as a cosurfactant enhances the viscosity of the surfactant system.

SURFACTANT SYSTEM

Figure 1:
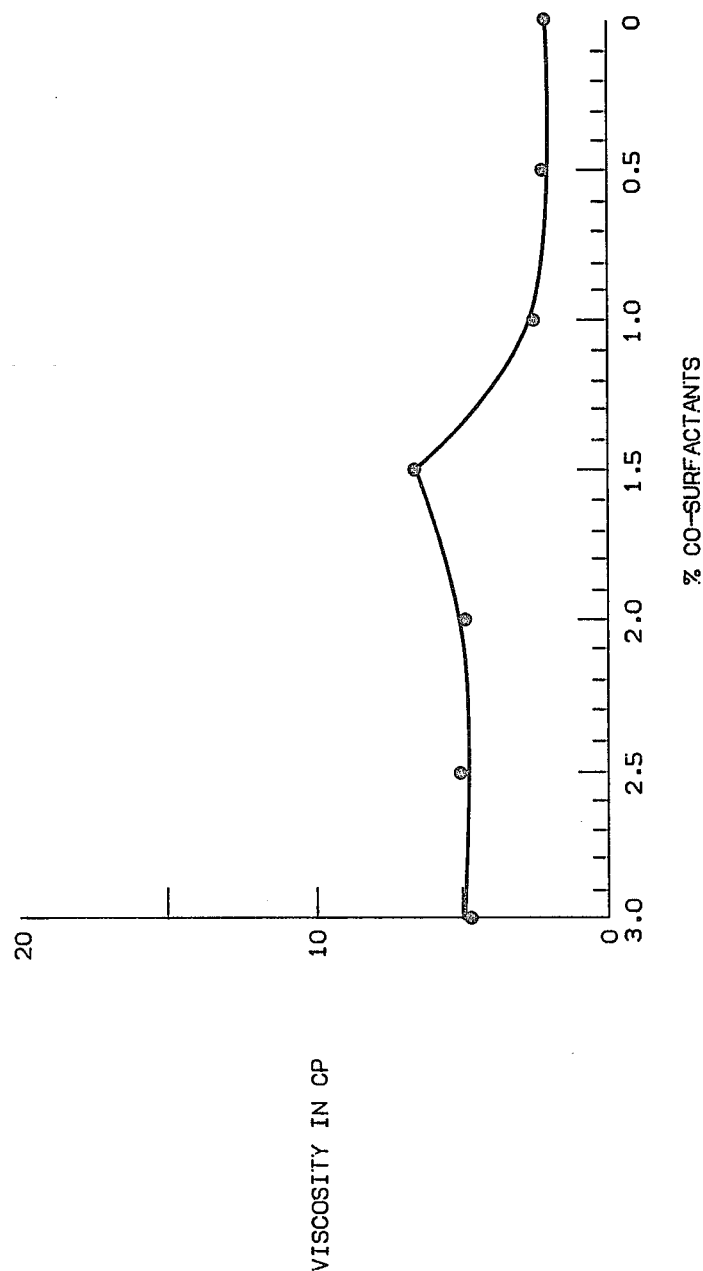
FIGS. 1, 2, and 3 are graphs illustrating the relationship between viscosity and cosurfactant systems consisting of sulfolane and isobutyl alcohol.

The preferred surfactant system of this invention is an aqueous system, optionally containing a protective agent. Water is used containing a certain quantity of sodium chloride for practical reasons. Typical and preferred compositions of the surfactant system of this invention are shown in the following table:

TABLE I

| Ingredient | Broad Range | Preferred Range |
|---|---|---|
| Water (parts by wt.) | 100 | 100 |
| Hydrocarbon Sulfonate* (active parts by wt.) | 0.1–15 | 1–12 |
| Sulfone/sulfolane derivative (parts by wt.) | 0.05–15 | 1–7 |
| Alcohol (parts by wt.) | 0.05–15 | 0.05–5 |
| Protective Agent (parts by wt.) | 0.01–3 | 0.05–2 |
| NaCl (parts by wt.) | .01–10 | 0.1–8 |

*The ranges for the active hydrocarbon sulfonate (e.g. petroleum sulfonate) in parts by weight. The "active" value is readily determined by multiplying parts by weight used and the fraction of active ingredients in the product.

Surfactant

The surfactant used in the surfactant system of this invention can broadly be a hydrocarbon sulfonate surfactant having an equivalent weight of from about 225 to about 600. Examples of hydrocarbon sulfonates include petroleum sulfonates, olefin sulfonates and alkyl sulfonates.

The preferred surfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

Cosurfactants

In accordance with this invention, sulfones and sulfolane derivatives are used as cosurfactants. These compounds can be represented by the following structural formulas:

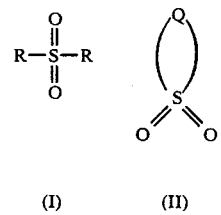

(I)　　(II)

wherein R is an alkyl, aryl, alkaryl, or aralkyl group and Q is a linear or branched alkylene group, the sulfone having a minimum of 2 carbon atoms and a maximum of 14 carbon atoms;

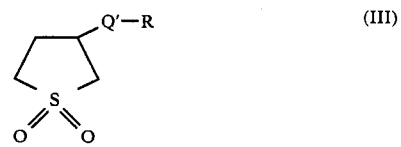

(III)

wherein Q' represents either oxygen,

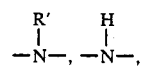

or sulfur, R represents either hydrogen or an alkyl, aryl, alkanoyl, aryloyl group, and R' is an alkyl group with 1 to 3 carbon atoms such that the total number of carbon atoms in the compound does not exceed 24; and

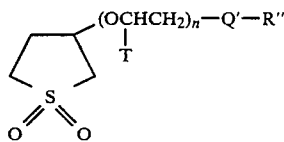 (IV)

wherein Q' is the same as above, T is either hydrogen or methyl, and R" is either an alkyl, alkaryl, aralkyl, or aryl group of from 10 to 20 carbon atoms.

Representative examples of sulfones of the type (I) suitable for use in the present invention include dimethyl sulfone, diphenyl sulfone, methyl n-octyl sulfone, diisobutyl sulfone, ethyl n-dodecyl sulfone, isopropyl n-decyl sulfone, di-n-propyl sulfone, n-butyl p-tolyl sulfone, di-p-tolyl sulfone, benzyl methyl sulfone, and mixtures thereof.

Representative examples of the sulfones of the type described in formula (II) suitable for use in the present invention include tetramethylene sulfone (sulfolane), pentamethylene sulfone, trimethylene sulfone, 2,6-dimethyl pentamethylene sulfone, 4-phenyl pentamethylene sulfone, and mixtures thereof.

Sulfolane derivatives as represented by formula (III) may be prepared as is well known in the art by the addition reactions of sulfolene with active hydrogen compounds such as water, alcohols, phenols, primary and secondary amines and mercaptans.

Representative compositions falling under formula (III) suitable for use in the present invention include 3-hydroxysulfolane, 3-mercaptosulfolane, 3-butylaminosulfolane, 3-butanoyloxysulfolane and mixtures thereof.

Sulfolane derivatives as represented by formula (IV) may be prepared as is well known in the art by the reaction of an active hydrogen compound such as water, alcohols, phenols, primary and secondary amines and mercaptans with an alkylene oxide to form a polyalkoxylated compound followed by the reaction of the latter with sulfolane in the presence of an acid or base addition catalyst.

Representative compositions falling under formula (IV) which are suitable for use in the present invention include mixed ethers of polyalkylene glycols prepared by the reaction of sulfolane with said polyalkoxylated compounds such as the bis(3-sulfolanyl) ether of N,N-bis(hydroxyethoxy[ethoxy(ethoxy)])decylamine; the 3-sufolanyl tridecyl ether of tetraethylene glycol; the 3-sulfolanyl dodecylthio ether of triethylene glycol; and the 3-sulfolanyl p-nonylphenyl ether of tetraethylene glycol and mixtures thereof.

Whatever sulfone or sulfolane derivative is uded must exhibit some solubility, dispersability or miscibility with brine. Generally, the sulfone or sulfolane derivative should have a water solubility of at least 0.01 and preferably, 0.1 grams per 100 grams of brine.

In the second embodiment of the present invention, $C_1$ to $C_8$ alcohols are present as cosurfactants along with the above sulfone compounds.

Representative examples of alcohols suitable for use in the present invention include isobutyl alcohol, isopropyl alcohol, t-butyl alcohol, isoamyl alcohol, octyl alcohols, hexyl alcohols and mixtures thereof.

Isobutyl alcohol is the currently preferred alcohol for use as a cosurfactant in admixture with the sulfone or sulfolane derivative. Generally, the alcohol should have a brine solubility of 0.01 to 20, preferably 0.1–5 grams per 100 grams of brine.

Oil Recovery Process

An oil recovery process using the surfactant system of this invention as defined above constitutes another embodiment of this invention. This process involves generally the conventional steps of post primary oil recovery and distinguishes over the known procedures primarily in the use of sulfones and combinations of sulfones and alcohols as cosurfactants.

Preflush

It is optional, although not necessary, to carry out a preflush step preceding the post-primary oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

Surfactantflooding

After the optional preflush step the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

After the optional preflush step the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. The surfactant system contains salt water, surfactant and the cosurfactant as the principal ingredients. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg++$ and $Ca++$ ions in the reservoir water. Typical hard brines contain more than 100 ppm of $Ca++$ and/or $Mg++$.

Protective agents are an especially preferred ingredient in the surfactant systems of this invention when used for oil recovery from reservoirs with hard brines. They aid in solubilizing the surfactant in a high salinity environment. Examples for such protecting agents are polyethoxylated fatty alcohols, polyethoxylated alkylphenols, and the sodium salts of sulfated polyethoxylated fatty alcohols and polyethoxylated alkylphenols.

Mobility Buffer

Following the surfactant slug it is presently preferred, although again not necessary to inject a mobility buffer solution into the reservoir. This buffer helps prevent fingering and enhances the efficiency of the oil recovery. Mobility buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer contains 50 to 20,000, preferably 200 to 5,000 ppm of the mobility reducing agent in the fluid.

The injection of the mobility buffer fluid can be at a constant composition or the mobility buffer can be graded, i.e., the injection starts out at a relatively high concentration at the leading edge and the concentration tapers off toward the trailing edge. As an example, the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

The following conditioning procedure was used in preparing the waterwet Berea sandstone cores for surfactantflooding.

Berea sandstone cores measuring approximately 3 feet in length and 3 inches in diameter were dried under vacuum for 24 hours at 250 F. Polycarbonate disc end plates with centrally located ⅛" threaded openings were secured to each end of the core with epoxy adhesive before applying an epoxy coating to the outside surface of the core. The epoxycoating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner; a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi recorded. With these values the original permeability to water, e.g., on the order of 3.2 mL/min at 43 psi, could be recorded. The pore volume of the core was calculated by the relationship:

$$\frac{\text{Brine Saturated Core Wt (g)} - \text{Dry Core Wt (g)}}{\text{Brine Density (g/mL)}} = $$

Core Pore Volume (mL)

The brine saturated core was oilflood in the conventional manner until oil break-through became detectable by the presence of alternate globules of oil and water in the effluent line. The oilflood was carried out to completion by the 24 hour recycling of oil through the core to remove all of the displaceable water. The total was displaced, i.e., water displaced at the point of oil break-through and water displaced by the 24 hour recycle procedure, was recorded as water displaced by oilflood. If desired, oil permeability was determined in a manner analogous to that used above for establishing original permeability to water. Prior to waterflood, the effluent line was air blown to remove oil.

The oilflood core was waterflooded in the conventional manner until water break-through became detechable by the presence of alternate globules of oil and water in the effluent line. The water flood was carried to completion by the 24 hour recycling of water through the core to remove all of the displaceable oil. The total oil displaced, i.e., oil displaced at the point of water break-through and oil displaced by the 24 hour recycle procedure, was recorded as oil displaced by waterflood. If desired, water permeability after waterflood can be determined in a manner analogous to that used above for original permeability to water. The residual oil volume remaining in the core was calculated by subtracting the oil volume displaced by waterflood from the water volume displaced by the oilflood. At this point, the core simulated an oil reservoir which had been exhaustively waterflooded. Cores were routinely conditioned in this manner prior to carrying out surfactantflood tests.

EXAMPLE I

This example demonstrates the oil recovery effectiveness of an aqueous saline surfactant system containing petroleum sulfonates and sulfolane. Three exemplary runs were carred out, respectively, using 3%, 5.5% and 7.5% pore volume slugs of the inventive surfactant system. Waterflood residual oil from a waterwet Berea sandstone core was recovered by surfactantflooding in the conventional manner, i.e., sequential injection of the inventive surfactant system and a thickened aqueous mobility buffer slug of polyacrylamide graded back logarithmically with Arkansas-Burbank water.

In each of the above cited three runs, the surfactant slug had the following wt % composition:

| | |
|---|---|
| Petroleum Sulfonates (Witco 10-410) | 3.6 |
| Sulfolane | 3.0 |
| Sodium chloride | 3.0 |
| Arkansas-Burbank Water | 88.2 |
| Unsulfonated Oil (Witco 10-410) | 2.2 |

The pore volumes of the 3"×3' cylindrical Berea sandstone cores, respectively, were 783 mL, 793 mL, and 806 mL. Each run involved the use of an aqueous-polyacrylamide mobility buffer. A 0.5 PV slug of Betz Hi Vis polyacrylamide (ca. 1700 ppm) in Arkansas-Burbank water was graded back logarithmically with Arkansas-Burbank water in each of the three runs.

In preparing the cores, 3.0 wt % of NaCl in Arkansas-Burbank water was used to saturate the three Berea sandstone cores. The water-saturated cores were oilflooded and 559.9 mL, 559 mL, and 569.5 mL, respectively, of oil was introduced into the respective cores. Subsequent waterflooding of the three cores gave, respectively, 275.5 mL, 288 mL, and 288 mL of oil leaving, respectively, 284.4 mL, 271 mL, and 281.5 mL of waterflood residual oil in the three Berea sandstone cores prior to the surfactantfloods.

In the course of surfactantflooding, total effluents of 1.99, 2.28 and 2.19 pore volumes (1558 mL, 1808 mL, and 1787 mL) were collected which contained, respectively, 225.1 mL, 220.3 mL, and 227.2 mL of tertiary oil representing 79.1%, 81.2%, and 80.7% of the waterflood residual oil. The results of these three invention runs are summarized in Table I along with three control runs (nos. 4, 5, 6) using isobutyl alcohol (IBA) cosurfactant.

TABLE I

3 Wt % Sulfolane Cosurfactant Runs for Berea Cores*

| Run No. | % PV Surfactant Slug | % Tertiary Oil Recovery | Optimum Salinity Wt % NaCl |
|---------|----------------------|-------------------------|----------------------------|
| 1       | 3.0                  | 79                      | 3.0                        |
| 2       | 5.5                  | 81                      | 3.0                        |
| 3       | 7.5                  | 81                      | 3.0                        |
| 4       | 3.0#                 | 61                      | 1.8                        |
| 5       | 5.0#                 | 85                      | 1.8                        |
| 6       | 7.5#                 | 90                      | 1.8                        |

*The surfactant was Witco 10-410 petroleum sulfonate in 3 wt % aqueous NaCl
These control runs involved the use of 3 wt % isobutyl alcohol cosurfactant and 3.6 wt % (active basis) Witco 10-410 petroleum sulfonate in 1.8 wt % NaCl.

Referring to the results in Table I, it is evident that at the 3% PV surfactant slug levels the inventive sulfolane/petroleum sulfonate system (run 1) gave higher tertiary oil recovery (79.1%) than did the prior art isobutyl alcohol/petroleum sulfonate system (run 4) (61.1) at the respective optimum salinity for each surfactant system. The inventive system and isobutyl alcohol system were comparable in runs 2 and 5 at about the 5% PV surfactant slug level (81.2% tertiary oil recovery in run 2 and 84.9% tertiary oil recovery in run 5). At the 7.5% PV surfactant slug level, the isobutyl alcohol/petroleum sulfonate system was somewhat better than the inventive system (control run 6 gave about 90% tertiary oil recovery whereas inventive run 3 gave about 81% tertiary oil recovery). The results in Table I suggest that smaller % PV surfactant slugs of the inventive sulfolane/petroleum sulfonate system may be used compared to a representative prior art surfactant system.

EXAMPLE II

This example demonstrates the oil recovery effectiveness of an aqueous saline surfactant system containing petroleum sulfonates and equal weights of isobutyl alcohol and sulfolane as the cosurfactant component. Three exemplary runs were carried out, respectively, using 3%, 5% and 7.5% pore volume slugs of the inventive surfactant system. Waterflood residual oil from a waterwet Berea sandstone core was recovered by surfactantflooding in the conventional manner, i.e., sequential injection of the inventive surfactant system and a thickened aqueous mobility buffer slug of polyacrylamide graded back logarithmically with Arkansas-Burbank water.

In each of the above three runs, the surfactant slug had the following wt % composition:

| Petroleum Sulfonate (Witco 10-410) | 3.6  |
|------------------------------------|------|
| Sulfolane                          | 1.5  |
| Isobutyl Alcohol                   | 1.5  |
| Sodium Chloride                    | 2.0  |
| Arkansas-Burbank Water             | 89.2 |
| Unsulfonated Oil (Witco 10-410)    | 2.2  |

The pore volume of the 30"×3' cylindrical Berea sandstone cores, respectively, were 802 mL, 814 mL, and 808 mL. Each run involved the use of an aqueous polyacrylamide mobility buffer. A 0.5 PV slug of Betz Hi Vis polyacrylamide (ca. 1700 ppm) in Arkansas-Burbank water was graded back logarithmically with Arkansas-Burbank water in each of the three runs.

In preparing the cores, 2.0 wt % of NaCl in Arkansas-Burbank water was used to saturate the three Berea sandstone cores. The water saturated cores were oilflooded and 565 mL, 585.5 mL, and 566 mL, respectively, of oil was introduced into the respective cores. Subsequent waterflooding of the three cores gave, respectively, 289 mL, 289.5 mL, and 263 mL of the oil leaving, respectively, 276 mL, 299 mL, and 303 mL of waterflood residual oil in the three Berea sandstone cores prior to the sufactantfloods.

In the course of surfactantflooding, total effluents of 2.31, 2.19 and 1.76 pore volumes (1853 mL, 1783 mL, and 1422 mL) were collected which contained, respectively, 239.4 mL, 230.6 mL, and 243.8 mL of tertiary oil representing 86.7%, 77.1% and 80.5% of the waterflood residual oil. The results of these three runs are summarized in Table II along with two control runs (nos. 4 and 5 repeated from Table I) using isobutyl alcohol (IBA) cosurfactant.

TABLE II

Mixed Isobutyl Alcohol/Sulfolane Cosurfactant Systems

| Run No. | % PV Surfactant Slug | % Tertiary Oil Recovery | Salinity Wt % NaCl |
|---------|----------------------|-------------------------|--------------------|
| 7       | 3.0                  | 87                      | 2.0                |
| 8       | 5.0                  | 77                      | 2.0                |
| 9       | 7.5                  | 81                      | 2.0                |
| 4       | 3.0                  | 61                      | 1.8                |
| 5       | 5.0                  | 85                      | 1.8                |

Referring to the inventive runs 7, 8 and 9 of Table II, it is evident that the 3% PV surfactant slug (run 7) was suprisingly superior in terms of oil recovery to the larger % PV surfactant slugs in runs 8 and 9. It is also noteworthy that the 3% PV surfactant slug (containing 1.5 wt % isobutyl alcohol and 1.5 wt % sulfolane) was better than a 3% PV surfactant slug containing 3 wt % isobutyl alcohol (run 4) and comparable in oil recovery to a 5% PV surfactant slug which also contained 3 wt % isobutyl alcohol as the only cosurfactant component. The runs of Table II were carried out at the approximate optimum salinities of the respective surfactant systems. Once again the efficiency of the inventive surfactant system is reflected by the good oil recovery of a relatively small 3% PV surfactant slug containing an IBA/sulfolane mixed cosurfactant.

EXAMPLE III

This example demonstrates the oil recovery effectiveness of an aqueous saline surfactant system containing petroleum sulfonates and various mixtures of isobutyl alcohol and sulfolane as the cosurfactant. The runs were carried out in essentially the same fashion as described in Example I and 7.5% PV slugs of the surfactant systems were used in each run. The results are summarized in Table III.

TABLE III

Isobutyl Alcohol (IBA)/Sulfolane Blends as Cosurfactants

| Run No. | Cosurfactant Blend, Wt % | Wt % NaCl | Oil Recovery |
|---|---|---|---|
| 10 | 2.5 IBA, 0.5 Sulfolane | 2.0 | 93 |
| 11 | 2.0 IBA, 1.0 Sulfolane | 2.4 | 95 |
| 9 | 1.5 IBA, 1.5 Sulfolane | 2.0 | 81 |
| 12 | 0.5 IBA, 2.5 Sulfolane | 2.5 | 79 |
| 6 | 3.0 IBA | 1.8 | 90 |
| 3 | 3.0 Sulfolane | 3.0 | 81 |

Referring to the inventive runs 9, 10, 11 and 12, it is evident that a variety of IBA/sulfolane mixtures can be used as the cosurfactant component. Runs 10 and 11 with 2.5 wt % IBA/0.5 wt % sulfolane and 2.0 wt % IBA/1.0 wt % sulfolane, respectively, were comparable in oil recovery efficiency to the prior art IBA/petroleum sulfonate system of control run 6. All runs were carried out at the approximate optimum salinities of the individual surfactant systems. Inventive runs 9 and 12 with 1.5 wt % IBA/1.5 wt % sulfolane and 0.5 wt % of IBA/2.5 wt % sulfolane, respectively, were comparable in oil recovery efficency to the sulfolane/petroleum sulfonate system of inventive run 3. It is evident that the sulfolane and sulfolane/IBA systems permit good oil recoveries at somewhat higher salinities than the prior art IBA system.

Figure 2:
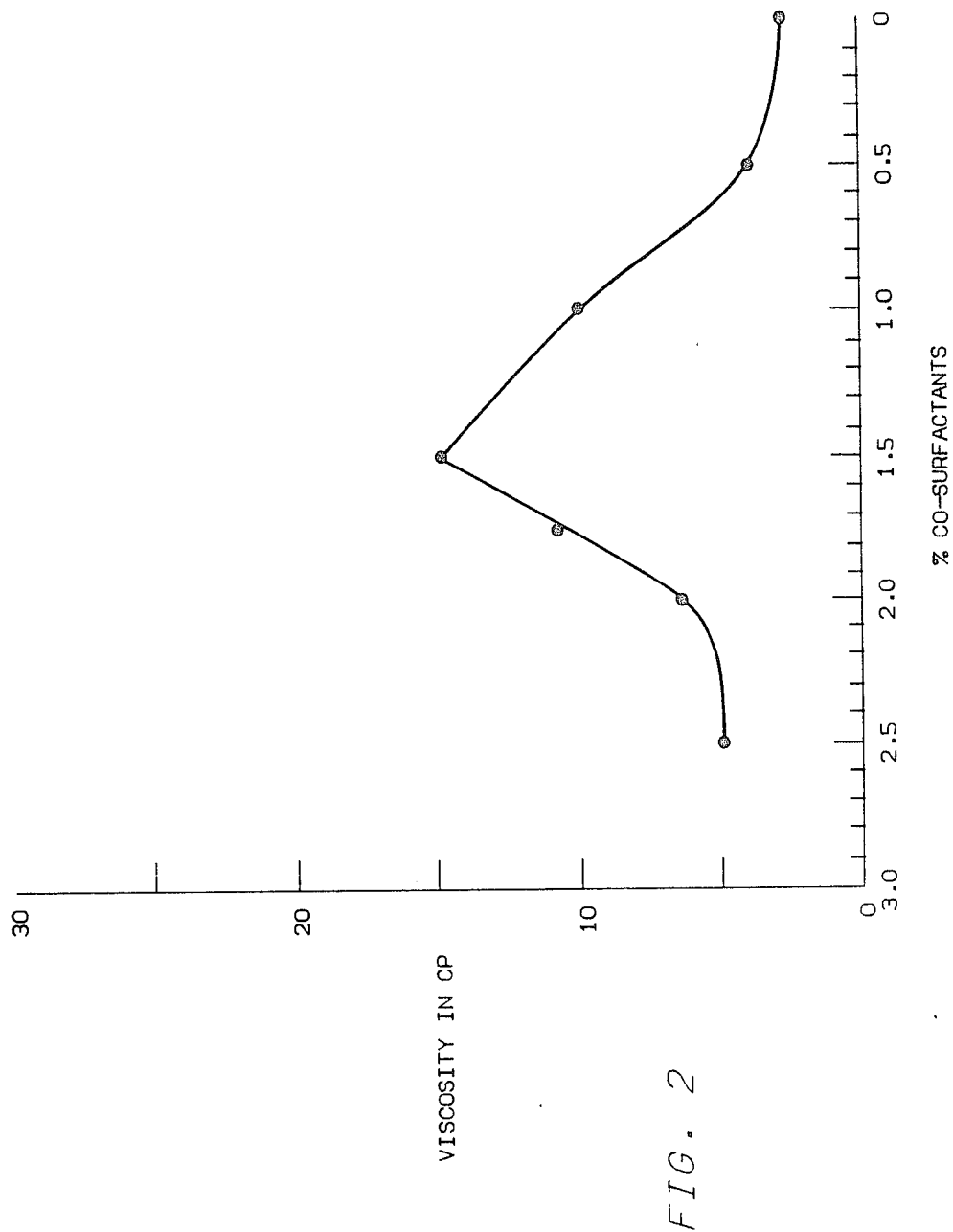
Figure 3:
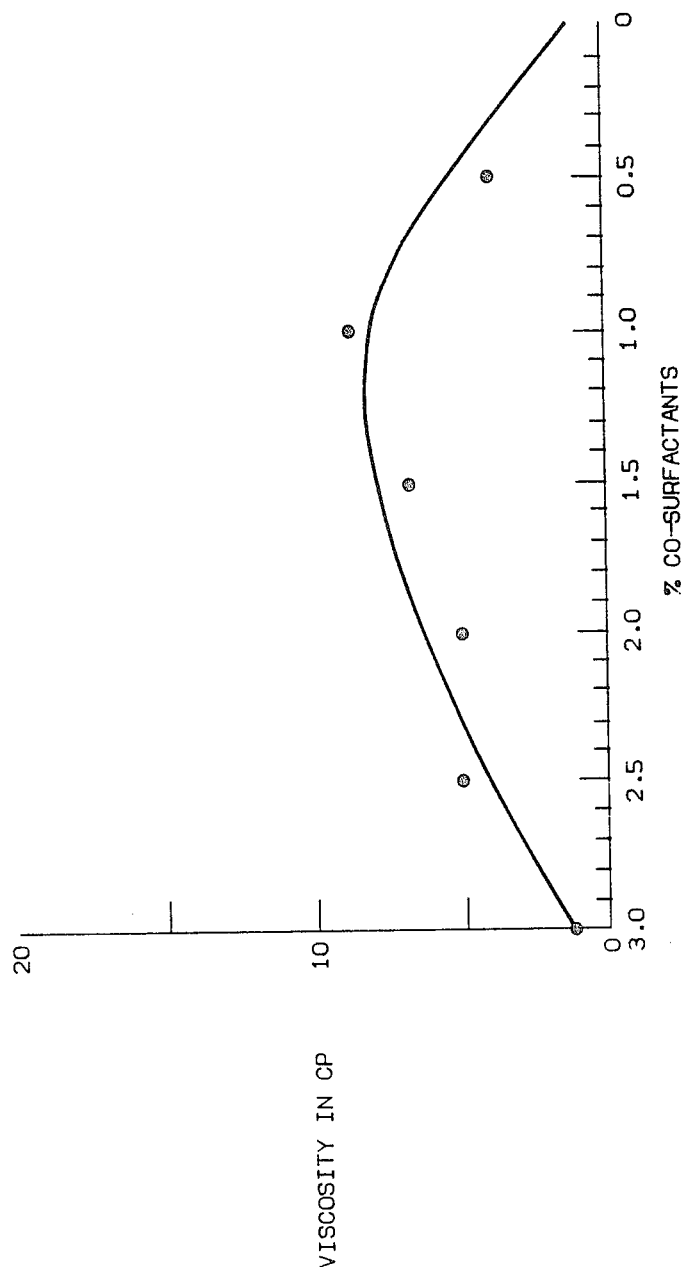

Referring to the FIGS. 1, 2, and 3 it is evident that the viscosity of the surfactant system passes through a maximum as a function of salinity, total cosurfactant concentration and the relative proportions of the cosurfactant species. For example in FIG. 2, a pronounced maximum in viscosity is evident at a cosurfactant composition of 1.5 wt. % sulfolane and 1.5 wt % isobutyl alcohol at a salinity of 2.2 wt % NaCl. Less pronounced maxima are observable in FIGS. 1 and 3, respectively, at 1.5 wt % sulfolane/1.5 wt % IBA (1.8 wt % NaCl) and at about 1.8 wt % sulfolane/1.2 wt % IBA (2.6 wt % NaCl). It is contemplated that other prior art cosurfactants in admixture with the inventive sulfones and sulfolane derivatives of the instant invention would likewise yield viscosity maxima useful in designing thickened surfatant systems suitable for enhanced oil recovery over a wide range of salinities. Such thickened surfactant systems would exhibit improved mobility control.

Reasonable variations and modifications which will become apparent to those skilled in the art can be made in this invention without departing from the spirit and scope thereof.

I claim:

1. An aqueous surfactant composition consisting of:
   (a) sodium chloride;
   (b) a hydrocarbon sulfonate surfactant having an equivalent weight of from about 225 to about 600; and
   (c) at least one sulfone cosurfactant selected from the group represented by the formula:

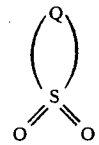

wherein Q is a linear or branched alkylene group, the sulfone having a minimum of 2 carbon atoms and a maximum of 14 carbon atoms; and wherein said sodium chloride is present in an amount from 0.01–10 parts by weight, said surfactant is present in an amount from 0.15–15 parts by weight and said sulfone cosurfactant is present in an amount from 0.05–15 parts by weight.

2. An aqueous composition according to claim 1 wherein said sodium chloride is present in an amount from 0.1–8 parts by weight, said surfactant is present in an amount from 1–12 parts by weight, and said cosurfactant is present in an amount from 1–7 parts by weight.

3. A composition according to claim 2 wherein said surfactant is a petroleium sulfonate having an equivalent weight from 325 to 600.

4. A composition according to claim 3 wherein said petroleum sulfonate has an equivalent weight from 325 to 500.

5. A composition according to claim 4 having at least one protective agent selected from the group consisting of polyethoxylated fatty alcohols, polyethoxylated alkylphenols, a sodium salt of a sulfated polyethoxylated fatty alcohol, and a sodium salt of a sulfated polyethoxylated alkylphenol.

6. A composition according to claim 5 wherein said cosurfactant is sulfolane.

7. A high viscosity aqueous surfactant composition consisting essentially of:
   (a) sodium chloride;
   (b) a hydrocarbon sulfonate surfactant having an equivalent weight of from about 225 to about 600; and
   (c) and a cosurfactant containing at least one $C_1$ to $C_8$ alcohol and at least one sulfone selected from the group represented by the formula:

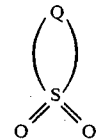

wherein Q is a linear or branched alkylene group, the sulfone having a minimum of 2 carbon atoms and a maximum of 14 carbons atoms; and wherein said sodium chloride is present in an amount from 0.01–10 parts by weight, said surfactant is present in an amount from 0.15–15 parts by weight and said sulfone cosurfactant is present in an amount from 0.15–15 parts by weight and said alcohol is present in an amount from 0.05–15 parts by weight.

8. An aqueous composition according to claim 7 wherein said sodium chloride is present in an amount from 0.1–8 parts by weight, said surfactant is present in an amount from 1–12 parts by weight, said sulfone cosurfactant is present in an amount from 1–7 parts by weight and said alcohol is present in an amount from 0.05–15 parts by weight.

9. A composition according to claim 8 wherein said surfactant is a petroleum sulfonate having an equivalent weight from 325 to 600.

10. A composition according to claim 8 wherein said petroleum sulfonate has an equivalent weight from 325 to 500.

11. A composition according to claim 10 having at least one protective agent selected from the group consisting of polyethoxylated fatty alcohols, polyethoxylated alkylphenols, a sodium of a sulfated polyethoxylated fatty alcohol and a sodium salt of a sulfated polyethoxylated alkylphenol.

12. A composition according to claim 11 wherein said cosurfactant contains isobutyl alcohol and sulfolane.

13. A process for recovery of hydrocarbon from a substerranean formation comprising injecting an aqueous surfactant system consisting essentially of NaCl, a hydrocarbon sulfonate surfactant having an equivalent weight from 225 to 600 and at least one sulfone cosurfactant selected from the group represented by the formula:

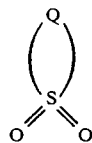

wherein Q is a linear or branched alkylene group, the sulfone having a minimum of 2 carbon atoms and a maximum of 14 carbon atoms; and into said formation via at least one injection well and thereby causing the so-injected system to mobilize and move oil from the injection well towards one or more production wells, and wherein said NaCl is present in an amount from 0.01–10 parts by weight, surfactant is present in an amount of from about 0.15 to about 15 parts by weight and said cosurfactant is present in an amount from about 0.05–15 parts by weight.

14. A process according to claim 13 wherein a $C_1$ to $C_8$ alcohol is additionally present as a cosurfactant in an amount from about 0.015–15 parts by weight.

15. A process in accordance with claim 14 wherein a mobility buffer is injected into said subterranean formation following the surfactant system.

16. A process in accordance with claim 15 wherein an aqueous drive fluid is injected into said subterranean formation following said mobility buffer fluid.

17. A process in accordance with claim 16 wherein said surfactant system further contains at least one protective agent selected from the group consisting of polyethoxylated fatty alcohols, polyethoxylated alkylphenols, a sodium salt of a sulfated polyethoxylated fatty alcohol, and a sodium salt or a sulfated polyethoxylated alkylphenol and is injected into a subterranean formation containing hard brine.

18. A process in accordance with claim 17 wherein said cosurfactant contains isobutyl alcohol and sulfolane.

* * * * *

UNITED STATES PATENT AND TRADEMARK OFFICE
CERTIFICATE OF CORRECTION

PATENT NO. : 4,485,872

DATED : December 4, 1984

INVENTOR(S) : Paul R. Stapp

It is certified that error appears in the above-identified patent and that said Letters Patent is hereby corrected as shown below:

Column 11, line 13, after "sodium" insert --- salt ---.

Column 12, line 15, delete "0.015-15" and insert --- 0.05-15 ---.

Signed and Sealed this

Fourth Day of June 1985

[SEAL]

Attest:

DONALD J. QUIGG

Attesting Officer    Acting Commissioner of Patents and Trademarks